«3,816,429
TETRAHYDROISOXAZOLO(5,4-c)ISOQUINOLINES
Neville Finch, West Orange, N.J., assignor to
Ciba-Geigy Corporation, Ardsley, N.Y.
No Drawing. Filed Aug. 10, 1971, Ser. No. 170,638
Int. Cl. C07d 85/22
U.S. Cl. 260—288 R                                    4 Claims

ABSTRACT OF THE DISCLOSURE

4-Aminoalkyl - 3a,4,5,9b - tetrahydroisoxazolo[5,4-c]
isoquinolines, e.g. those of the formula

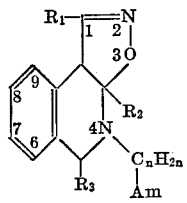

$R_1$=aliphatic, cycloaliphatic, araliphatic or aromatic radical
$R_2$=H or alkyl radical
$R_3$=H or $R_1$, $n$=2–7
Am=an amino group
or salts thereof are tranquilizers.

SUMMARY OF THE INVENTION

The present invention concerns and has for its object the provision of new 4-aminoalkyl-3a,4,5,9b-tetrahydroisoxazolo[5,4-c]isoquinolines, more particularly of those corresponding to Formula I

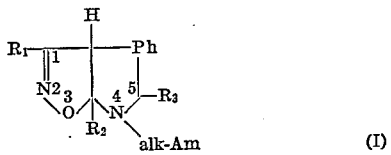

in which $R_1$ is an aliphatic, cycloaliphatic, araliphatic or aromatic radical, $R_2$ is hydrogen or lower alkyl, $R_3$ is hydrogen or $R_1$, Ph is a 1,2-phenylene radical, alk is lower alkylene separating Am from the nitrogen atom by at least 2 carbon atoms and Am is an amino group, or therapeutically useful carboxylic or sulfamic acid addition salts thereof, of corresponding pharmaceutical compositions, and of methods for the preparation and application of these products. Said compositions are useful tranquilizing agents, preferably for enteral, e.g. oral application.

DESCRIPTION OF THE PREFERRED EMBODIMENTS

An aliphatic or cycloaliphatic radical $R_1$ or $R_3$ is preferably lower alkyl or cyclo-lower alkyl, e.g. methyl, ethyl, n- or i-propyl or-butyl, tert.-butyl, straight or branched pentyl, hexyl or heptyl; cyclopropyl, 1- or 2-methylcyclopropyl, 2,3-dimethylcyclopropyl, cyclobutyl, cyclopentyl, 1-, 2- or 3-methylcyclopentyl, 3,4-dimethylcyclopentyl, cyclohexyl, 1-, 2-, 3- or 4-methylcyclohexyl, 2,6-dimethylcyclohexyl, 2,4,6-trimethylcyclohexyl, 3,3,5-trimethylcyclohexyl or cycloheptyl. The term "lower" referred to above or hereinafter in connection with organic radicals or compounds, respectively, defines such with up to 7, preferably up to 4, carbon atoms.

An araliphatic or aromatic radical $R_1$ or $R_3$ is preferably represented by Ar—$C_mH_{2m}$, wherein $m$ is an integer from 0 to 4 and Ar is a monocyclic, iso- or heterocyclic aryl radical, the latter of which contains advantageously but one heteroatom, such as nitrogen, oxygen or sulfur. Said aryl radical Ar is unsubstituted or substituted by one or more than one, preferably one or two of the same or different substituents attached to any of the positions available for substitution. Such substituents are, for example, lower alkyl, e.g. methyl, ethyl, n- or i-propyl or -butyl, free, etherified or esterified hydroxy, such as lower alkoxy, e.g. methoxy, ethoxy, n- or i-propoxy or -butoxy, or halo, e.g. fluoro, chloro or bromo. Preferred radicals Ar—$C_mH_{2m}$ are thse, wherein $m$ is an integer from 0 to 2, and Ar is phenyl, (lower alkyl)-phenyl, (hydroxy)-phenyl, mono- or di-(lower alkoxy or halo)-phenyl, pyridyl, (lower alkyl)-pyridyl, furyl, (lower alkyl)-furyl, thienyl or (lower alkyl)-thienyl.

The radical $R_2$ represents preferably hydrogen or straight chain lower alkyl, especially methyl, but also ethyl, n-propyl or -butyl.

The 1,2-phenylene radical Ph is unsubstituted or substituted as shown above for Ar. It preferably represents 1,2-phenylene, (lower alkyl)-1,2-phenylene, (hydroxy)-1,2-phenylene, mono- or di-(lower alkoxy or halo)-1,2-phenylene.

The lower alkylene radical "alk" preferably represents 1,2-ethylene, 1,2- or 1,3-propylene, but also, for example, 1,2-, 1,3-, 2,3- or 1,4-butylene, 2-methyl-1,3-propylene or 1,2-, 1,3-, 2,3-, 1,4- or 1,5-pentylene.

The amino group Am is a primary, but preferably a secondary or tertiary amino group, such as mono- or di-lower alkylamino, e.g. methylamino, ethylamino, n- or i-propylamino or n-butylamino; dimethylamino, N-methyl-N-ethylamino, diethylamino, di-n-propylamino, di-isopropylamino or di-n-butylamino; lower alkyleneimino or monoaza-, -oxa- or -thia-lower alkyleneimino, e.g. pyrrolidino, 2-methyl-pyrrolidino, piperidino, 2- or 4-methylpiperidino, 1,6- or 2,5-hexamethyleneimino, 1,7- or 2,6-heptamethyleneimino; piperazino, N-(methyl, ethyl, n-propyl- or i-propyl)-piperazino, N-(methyl, ethyl or n-propyl)-3-aza-1,5- or 1,6-hexyleneimino, or N-methyl-4-aza-1,7- or 2,6-heptyleneimino; morpholino, 3-methyl-morpholino or thiamorpholino.

Salts of the compounds of Formula I are preferably those of therapeutically useful carboxylic or sulfamic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic or hydrocarbon-substituted sulfamic acids, such as aliphatic, cycloaliphatic or aromatic sulfamic acids, for example, lower alkyl, cyclo-lower alkyl, phenyl or substituted phenylsulfamic acids, such as methyl-, ethyl-, cyclopropyl-, cyclopentyl-, phenyl-, tolyl-, or especially cyclohexylsulfamic acid; methionine, tryptophan, lysine or arginine.

The compounds of this invention exhibit valuable pharmacological properties for example, a mild central nervous system depressing effect. This can be demonstrated in animal tests using, for example, mammals, such as mice, rats, cats, dogs or monkeys as test animals. The compounds of the invention can be applied enterally or parenterally, e.g. orally, subcutaneously or intraperitoneally, for example in the form of aqueous solutions or suspensions, at dosages between about 1 and 150 mg./kg./day, preferably between about 3 and 80 mg./kg./day. For example, said compounds produce a quieting effect and a decrease in the spontaneous motor activity in the mouse jiggle-cage test. Primarily, however, they exhibit antianxiety effects in rats or squirrel monkeys, advantageously at dosages between about 5 and 30 mg./kg./day. Accordingly, they reduce acquired fear or anxiety associated with a psychological conflict. It is established by simultaneously rewarding with food and punishing with shock all lever-pressing responses of the animals made in the presence of a discriminative tone stimulus. For example, rats first learn to press a lever to obtain a milk reward, which is delivered on the average of once per two minutes. After this schedule, which lasts fifteen minutes, a tone stimulus of three minute duration is presented. This stimulus signals a change from a variable interval schedule (CRF). During the CRF schedule, all lever responses not only produce milk rewards but also an electric shock to the animal's feet. During the period in which a shock accompanies the food reward, the tone stimulus produces a suppression of all lever pressing responses. Thus, for example, administration of 1-tert.butyl-4-(3-dimethylaminopropyl) - 3a,4,59b - tetrahydroisoxazolo[5,4-c]isoquinoline cyclohexylsulfamate or maleate, which are characteristic compounds of the invention, at doses between about 5 and 30 mg./kg./day applied intraperitoneally to rats or orally to squirrel monkeys, reinstate these responses, indicating that the animals tolerate more shocks in obtaining the food reinforcement. Accordingly, the compounds of the invention are useful tranquilizers in combatting anxiety problems. Besides the above-mentioned utility, they are also useful as intermediates in the preparation of other valuable products, especially of pharmacologically active agents.

Preferred compounds of the invention are those of Formula I, in which $R_1$ is lower alkyl, cyclo-lower alkyl or Ar—$C_mH_{2m}$, wherein $m$ is an integer from 0 to 2 and Ar is phenyl, (lower alkyl)-phenyl, (hydroxy)-phenyl, mono- or di-(lower alkoxy or halo)-phenyl, pyridyl, (lower alkyl)-pyridyl, furyl, (lower alkyl)-furyl, thienyl or (lower alkyl)-thienyl, $R_2$ is hydrogen or straight lower alkyl, $R_3$ is hydrogen or $R_1$, Ph is 1,2-phenylene, (lower alkyl)-1,2-phenylene, (hydroxy)-1,2-phenylene, mono- or di-(lower alkoxy or halo)-1,2-phenylene, alk is alkylene with 2 to 4 carbon atoms separating Am from the nitrogen atom by at least 2 carbon atoms, and Am is amino, mono- or di-lower alkylamino, lower alkyleneimino or monoaza-, oxa- or -thia-lower alkyleneimino, or a therapeutically useful carboxylic or sulfamic acid addition salt thereof.

Particularly useful are compounds of the Formula I, in which $R_1$ is lower alkyl, phenyl, (lower alkyl)-phenyl, (hydroxy)-phenyl, mono- or di-(lower alkoxy or halo)-phenyl, $R_2$ is hydrogen or methyl, $R_3$ is hydrogen or $R_1$, Ph is 1,2-phenylene, (lower alkyl)-1,2-phenylene, (hydroxy)-1,2-phenylene, mono- or di-(lower alkoxy or halo)-1,2-phenylene, alk is alkylene with 2 to 4 carbon atoms separating Am from the nitrogen atom by at least 2 carbon atoms, and Am is mono- or di-lower alkylamino, lower alkylene imino, piperazino, N-lower alkyl-piperazino, morpholino or thiamorpholino, or a therapeutically useful carboxylic or sulfamic acid addition salt thereof.

Valuable are compounds of Formula II

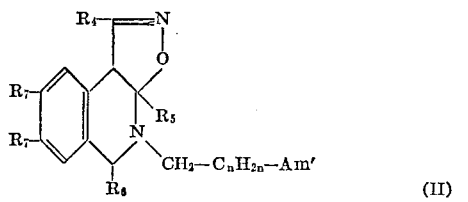

(II)

in which $R_4$ is alkyl with up to 4 carbon atoms, phenyl, tolyl, hydroxyphenyl, mono- or di-(methoxy, fluoro, chloro or bromo)-phenyl, each of $R_5$ and $R_6$ is hydrogen or methyl, $R_7$ is hydrogen or methoxy, Am' is mono- or dialkylamino in which alkyl has up to 4 carbon atoms, pyrrolidino, piperidino, piperazino, 4-methyl-piperazino, morpholino or thiamorpholino, and $n$ is the integer 1, 2 or 3, or a therapeutically useful carboxylic or sulfamic acid addition salt thereof.

Especially valuable are compounds of Formula II, in which $R_4$ is i-propyl, tert.butyl, phenyl, or 2,6-dichlorophenyl, each of $R_5$ and $R_6$ is hydrogen or methyl, $R_7$ is hydrogen or methoxy, and Am' is mono- or di-(methyl, ethyl or n-propyl)-amino, piperidino, 4-methylpiperazino or morpholino and $n$ is the integer 1 or 2, or the cyclohexylsulfamate or maleate thereof.

The compounds of the invention are prepared according to standard methods, for example by reacting:

(a) a nitriloxide with a 2-aminoalkyl-1,2-dihydroisoquinoline, more particularly compounds of the formulae

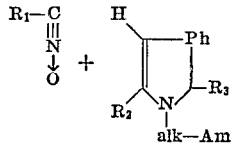

or (b) a 4-unsubstituted 3a,4,5,9b-tetrahydroisoxazolo[5,4-c]isoquinoline with a reactively esterified aminoalkanol, more particularly compounds of the formulae.

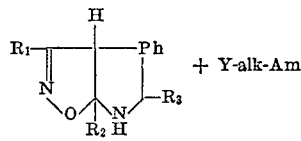

wherein Y is a halogen atom or an aliphatic or aromatic sulfonyloxy group or (c) a reactively esterified 4-hydroxyalkyl-3a,4,5,9b-tetrahydroisoxazolo[5,4-c]isoquinoline with ammonia, a primary or secondary amine, more particularly compounds of the formulae

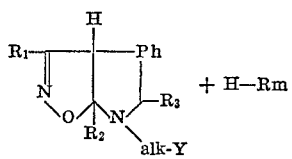

wherein Y has the meaning given above and, if desired, converting any resulting compound into another compound of the invention.

In the starting materials used in the above reactions, $R_1$, $R_2$, $R_3$, Ph, alk and Am have the meanings given under Formula I and Y preferably represents halogen, e.g. chloro, bromo or iodo, but can also stand for methane-, ethane- or benzenesulfonyloxy, tosyloxy or brosyloxy.

The above process is carried out according to standard methods, in the presence or absence of diluents, preferably such as are inert to the reagents and are solvents thereof, of catalysts, condensing agents or inert atmospheres, such as nitrogen, at temperatures and pressures at, above, or advantageously below room temperature or atmospheric pressure respectively.

In the above process, e.g. reactions (b) and (c), the amine reagent is advantageously used in excess, in order to neutralize the generated acid. It can, however, also be used in equivalent amounts in the presence of other condensing agents such as inorganic or organic bases, e.g. alkali metal carbonates or bicarbonates or tertiary nitrogen bases, for example, tri-lower alkylamines, N,N-dimethylaniline or pyridine.

The compounds of the invention so obtained can be converted into each other according to known methods. For example, resulting compounds in which Am stands for a primary or secondary amino group, can be reacted with a reactive ester of a corresponding alcohol, preferably of a lower alkanol or methylated with formaldehyde in the presence of formic acid or its derivatives.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with acids that are suitable for the formation of therapeutically useful salts, preferably the carboxylic or sulfamic acids mentioned above.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the $R_1$-nitriloxides mentioned above in process (a), can be formed preferably under the reaction conditions by dehydrohalogenation of the corresponding $R_1$-hydroxamic acid halides, such as chlorides or bromides, with tertiary amines, such as tri-lower alkyl-amines. Mainly, those starting materials should be used in the process of the invention that lead to the formation of those compounds indicated above as being specially valuable.

The starting materials used are known or, if new, can be prepared according to the methods illustrated by the examples herein. For process (a), the 2-aminoalkyl-1,2-dihydroisoquinoline is advantageously prepared by the reduction of the corresponding quaternary salt, namely the 2-ammoniumalkylisoquinolinium dihalide, e.g. dichloride, with a complex di-light metal hydride, such as an alkali metal aluminum hydride, e.g. lithium aluminum hydride or lithium tri-tert.butoxy aluminum hydride. It can also be reduced with an alkyl lithium compound, e.g. methyl lithium, in which course the alkyl group is simultaneously introduced into the 1-position. The quaternary salt is in turn obtained according to the method described in J. Am. Chem. Soc., 77, 3541 (1955). The $R_1$-nitriloxide, wherein $R_1$ has the meaning under Formula I, is prepared by the dehydrohalogenation of the corresponding $R_1$-hydroxamic acid halide, or advantageously, in situ, by the above process in the presence of an organic base, such as triethylamine, N,N-dimethylaniline, pyridine or preferably N,N-diisopropyl-ethylamine. The $R_1$-hydroxamic acid halide can be obtained, in turn, by the halogenation, e.g. chlorination or bromination, of the corresponding $R_1$-aldoxime as has been described, for example, for the pivalohydroxamic acid chloride in Ber. 98, 1354 (1965). The starting materials used in processes (b) and (c) can be prepared by the addition reaction shown for process (a).

The pharmacologically active compounds of the invention are useful in the manufacture of pharmaceutical compositions comprising an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

The solution of 46.4 g. of 2-(3-dimethylaminopropyl)-1,2-dihydroisoquinoline in 150 ml. of diethyl ether is added dropwise during 40 minutes to the solution of 40 g. of pivalohydroxamic acid chloride in 400 ml. of diethyl ether while stirring at $-60°$ under nitrogen. Thereupon the solution of 50 g. of N,N-diisopropylethylamine in 150 ml. of diethyl ether is added dropwise during 1 hour and the mixture stirred at $-60°$ for 2 hours and 16 hours at room temperature. It is washed with water, dried, evaporated and the residue taken up in acetone. The solution is combined with a concentrated solution of 40 g. cyclohexylsulfamic acid, the mixture diluted with diethyl ether, the precipitate collected and recrystallized from acetone, to yield the 1-tert.butyl-4-(3-dimethylaminopropyl)-3a,4, 5,9b-tetrahydroisoxazolo[5,4 - c]isoquinoline cyclohexylsulfamate of the formula

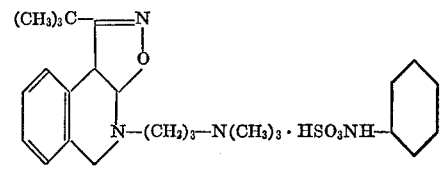

melting at 126–128°. The analogously prepared maleate melts at 102–104°.

The starting material is prepared as follows: The mixture of 200 g. of isoquinoline and 158.1 g. of 3-dimethylaminopropyl chloride hydrochloride is stirred for 1 hour at room temperature, diluted with 2 lt. of toluene and refluxed for 22 hours on a water trap. After cooling, it is filtered and the residue washed with toluene, to yield the 2-(3-dimethylaminopropyl)-isoquinolinium chloride hydrochloride, melting at 222–224°.

200 g. thereof are finely ground and added portionwise during 4 minutes to the suspension of 52.6 g. of lithium aluminum hydride in 1 lt. of diethyl ether. After stirring for an additional 3 minutes, the mixture is cooled in an ice bath and the excess hydride decomposed by the careful addition of 35% aqueous sodium potassium tartrate during 7 minutes. The mixture is filtered, the filtrate washed with water, dried and evaporated as rapidly as possible. The residue is distilled and the fraction boiling at 97–102°/0.06 mm. Hg collected, to yield the 2-(3-dimethylaminopropyl)-1,2-dihydroisoquinoline.

Example 2

The mixture of 6.2 g. of 1-tert.butyl-3a-methyl-4-(3-bromopropyl)-3a,4,5,9b - tetrahydroisoxazolo[5,4-c]isoquinoline, 70 ml. of ethanol and 12 ml. anhydrous dimethylamine is allowed to stand for 2 days in the refrigerator and stirred for 22 hours at room temperature. It is evaporated, the residue is taken up in water, the mixture made basic with 2 N aqueous ammonia, extracted with diethyl ether and the extract washed with water, dried and evaporated. The residue is chromatographed on 150 g. of neutral aluminum oxide (Activity III) and eluted with (1) 800 ml. of hexane, (2) 400 ml. 10% diethyl ether in hexane, (3) 800 ml. 20% diethyl ether in hexane and (4) 400 ml. of diethyl ether. Fraction 4 is evaporated, the residue dissolved in acetone, the solution neutralized with cyclohexylsulfamic acid in acetone and the precipitate formed filtered off, to yield the 1-tert.butyl-3a-methyl-4-(3 - dimethylaminopropyl) - 3a,4,5,9b - tetrahydroisoxazolo[5,4-c]isoquinoline cyclohexylsulfamate of the formula

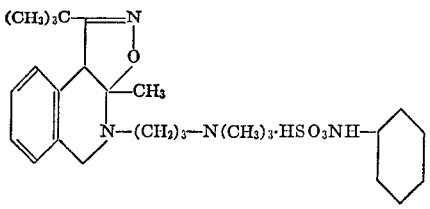

melting at 153–155°.

The starting material is prepared as follows: To the solution of 220 g. of 3-methylisoquinoline in 1 lt. of toluene, 208 g. of 1,3-dibromopropane are added dropwise, the mixture stirred for 1½ hours at room temperature and refluxed for 16 hours. The precipitate formed is filtered off and washed with toluene, to yield the 3-methyl-2-(3-bromopropyl)-isoquinolinium bromide, melting at 167–169°.

20 g. thereof are added portionwise to the solution of 29.4 g. of lithium tri-tert. butoxy aluminum hydride in 150 ml. of tetrahydrofuran while stirring under nitrogen and cooling with an ice bath for 10 minutes. After stirring for an additional 10 minutes at room temperature, the mixture is evaporated under reduced pressure, the residue is taken up in water and diethyl ether, the whole filtered, the organic filtrate separated, washed with saturated aqueous sodium chloride, dried and evaporated, to yield the 3-methyl-2-(3-bromopropyl)-1,2-dihydroisoquinoline.

The solution of 10.1 g. thereof in 80 ml. of methylene chloride is added dropwise to the solution of 9 g. of pivalohydroxamic acid chloride in 250 ml. of diethyl ether while stirring at —60° under nitrogen. Thereupon 12 g. of N,N-diisopropyl-ethylamine in 60 ml. of diethyl ether are added dropwise during ½ hour and the mixture stirred for 3 hours at —60° and 16 hours at room temperature. It is washed twice with water, dried and evaporated under reduced pressure, to yield the 1-tert.butyl-3a-methyl - 4 - (3-bromopropyl) - 3a,4,5,9b - tetrahydroisoxazolo[5,4-c]isoquinoline. It is dissolved in 150 ml. of ethanol, the solution neutralized with a concentrated ethanolic solution of picric acid and the precipitate formed filtered off, to yield the corresponding picrate melting at 134–136°.

11 g. of the picrate are taken up in the minimum amount of methylene chloride and passed through a column of 200 g. basic aluminum oxide (Activity III). The column is eluted with 1 lt. of methylene chloride and the eluate evaporated, to yield the purified free compound back again.

Example 3

The solution of 5.23 g. of 1-methyl-2-(3-dimethylaminopropyl)-1,2-dihydroisoquinoline in 75 ml. of diethyl ether is added dropwise to the solution of 4.7 g. of pivalohydroxamic acid chloride in 470 ml. of diethyl ether while stirring at —60° under nitrogen. Thereupon 4.8 g. of N,N-diisopropyl-ethylamine in 15 ml. of diethyl ether are added and the mixture stirred for 2 hours at —60° and for 16 hours at room temperature. It is washed twice with water, dried and evaporated. The residue is taken up in ethanol, the solution neutralized with maleic acid in ethanol and the precipitate formed filtered off, to yield the 1-tert.butyl-5-methyl-4-(3-dimethylaminopropyl) - 3a,4,5,9b - tetrahydroisoxazolo[5,4-c]isoquinoline maleate of the formula

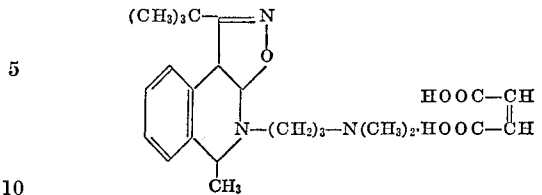

melting at 120–122°.

The starting material is prepared as follows: 10 g. of finely ground 2 - (3 - dimethylaminopropyl)-isoquinolinium chloride hydrochloride are added portionwise to 80 ml. of 2-molar methyl lithium in diethyl ether while stirring under nitrogen. After 5 minutes, another 25 ml. 2-m. ethereal methyl lithium are added, the mixture stirred for ½ hour and the excess lithium methyl decomposed by the careful addition of water. The organic phase is separated, washed with water, dried and evaporated, to yield the 1-methyl-2-(3-dimethylaminopropyl)-1,2-dihydroisoquinoline.

The solution of 6.5 g. of 2-[3-(4-methylpiperazino)-propyl]-1,2-dihydroisoquinoline in 100 ml. of diethyl ether is added dropwise to the solution of 5.6 g. of benzohydroxamic acid chloride in 60 ml. of diethyl ether while stirring at —60° under nitrogen. Thereupon 6 g. of N,N-diisopropyl-ethylamine in 50 ml. of diethyl ether are added dropwise during 1 hour and the mixture is stirred for 2 hours at —60° and 16 hours at room temperature. It is washed with water, dried and evaporated under reduced pressure. The residue is taken up in diethyl ether, the solution chromatographed on 180 g. neutral aluminum oxide (Activity III) and eluted with (1) 500 ml. of hexane, (2) 1 lt. of diethyl ether and (3) another 500 ml. of diethyl ether. Fraction 2 is evaporated, the residue taken up in ethanol, the solution neutralized with ethanolic maleic acid and the precipitate formed filtered off, to yield the 1-phenyl-4-[3-(4-methylpiperazino)-propyl]-3a,4,5,9b-tetrahydroisoxazolo[5,4-c]isoquinoline dimaleate of the formula

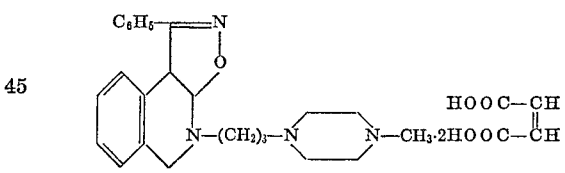

melting at 133–136°.

The starting material is prepared as follows: The mixture of 200 g. of isoquinoline, 1 lt. of toluene and 208 g. of 1,3-dibromopropane is stirred for 1½ hours at room temperature and refluxed for 16 hours. After cooling, it is filtered and the precipitate washed with toluene, to yield the 2-(3-bromopropyl)-isoquinolinium bromide, melting at 145–148°.

To the solution of 60 g. thereof in 150 ml. of water, covered by 300 ml. of diethyl ether, 28 g. of potassium cyanide in 75 ml. of water are added and the mixture stirred at room temperature under nitrogen. After ½ hour, the organic phase is separated, washed with water, dried and evaporated, to yield the 1-cyano-2-(3-bromopropyl)-1,2-dehydroisoquinoline.

It is taken up in the minimum amount of benzene, 38 g. of 4-methyl-piperazine are added and the mixture stirred at 60° for 16 hours. It is filtered, the filtrate washed with water, dried and evaporated. The residue is taken up in methanol, the solution acidified with 48% hydrobromic acid and heated for 20 minutes on the steam bath. It is evaporated under reduced pressure and the residue recrystallized from ethanol, to yield the 2-[3-(4-methylpiperazino)-propyl] - isoquinolinium bromide hydrobromide. 30 g. thereof are finely ground and added portionwise to the suspension of 5.2 g. of lithium aluminum hydride in 500 ml. of diethyl ether while stirring. After 5 minutes, 25 ml. of 35% aqueous sodium potassium tartrate are added, the mixture filtered, the filtrate washed with water, dried and evaporated, to yield the 2-[3-(4-methylpiperazino)-propyl]-1,2-dihydroisoquinoline.

EXAMPLE 5

The solution of 3.2 g. of 6,7-dimethoxy-4-(3-dimethylaminopropyl)-1,2-dihydroisoquinoline in 40 ml. of diethyl ether is added dropwise to the solution of 3.14 g. of tert. pivalohydroxamic acid chloride in 150 ml. of diethyl ether at —60° while stirring under nitrogen. Thereupon 4.25 g. of N,N-diisopropylethylamine in 30 ml. of diethyl ether are added dropwise and the mixture stirred for 3 hours at —60° and for 16 hours at room temperature. It is washed with water, dried, evaporated, the residual oil chromatographed on 100 g. of neutral aluminum oxide (Activity III), eluted with diethyl ether, the eluate evaporated and the residue recrystallized from isopropanol, to yield the 1-tert.butyl-7,8-dimethoxy-4-(3-dimethylaminopropyl) - 3a,4,5,9b - tetrahydroisoxazolo[5,4-c]isoquinoline of the formula

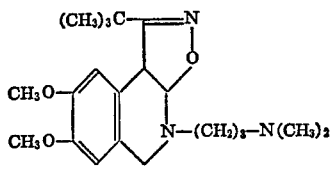

melting at 138–140°.

The starting material is prepared as follows: The mixture of 10.5 g. of 6,7-dimethoxyisoquinoline, 200 ml. of isopropanol and 17.5 g. of 3-dimethylaminopropyl bromide hydrobromide is refluxed for 5 hours. It is cooled, filtered and the residue recrystallized from methanol, to yield the 6,7-dimethoxy-2-(3-dimethylaminopropyl) - isoquinolinium bromide hydrobromide, melting at 205–207°. 30 g. thereof are finely ground and added portionwise to the suspension of 5.2 g. of lithium aluminum hydride in 500 ml. of diethyl ether while stirring. After 6 minutes, 30 ml. of saturated aqueous sodium potassium tartrate are added, the mixture filtered, the filtrate washed with water, dried and evaporated under reduced pressure, to yield the 6,7-dimethoxy-2-(3-dimethylaminopropyl)-1,2-dihydroisoquinoline.

EXAMPLE 6

The solution of 3 g. of 2-(3-dimethylaminopropyl)-1,2-dihydroisoquinoline in 30 ml. of diethyl ether is added dropwise to the solution of 2.6 g. of 2,6-dichlorobenzonitrile oxide in 200 ml. of diethyl ether while stirring under nitrogen. The mixture is stirred for 16 hours at room temperature, concentrated under reduced pressure, the precipitate formed filtered off and recrytallized from diethyl ether, to yield the 1-(2,6-dichlorophenyl)-4-(3-dimethylaminopropyl) - 3a,4,5,9b - tetrahydroisoxazolo[5,4-c]isoquinoline of the formula

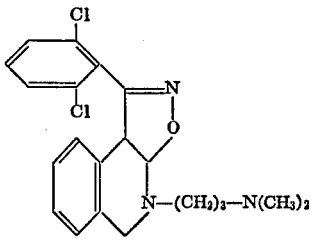

melting at 95–97°.

EXAMPLE 7

According to the processes shown and illustrated above, the following compounds of Formula II are prepared from equivalent amounts of the corresponding starting materials: $R_7$=H.

| Number | $R_4$ | $R_5$ | $R_6$ | $C_nH_{2n}$ | Am' | Salt | M.P., °C. | Recrystallized from— |
|---|---|---|---|---|---|---|---|---|
| 1 | $(CH_3)_2CH$ | H | H | $(CH_2)_3$ | $N(CH_3)_2$ | A | 112–114 | C |
| 2 | $CH_3$ | H | H | $(CH_2)_3$ | $N(CH_3)_2$ | A | 103–105 | C |
| 3 | $(CH_3)_3C$ | H | H | $(CH_2)_3$ | $NHCH_3$ | A | 116–118 | C–D |
| 4 | $(CH_3)_3C$ | H | H | $(CH_2)_3$ | $NHC_2H_5$ | A | 99–103 | C–D |
| 5 | $(CH_3)_3C$ | H | H | $(CH_2)_3$ | $NHn-C_4H_9$ | 2A | 74–76 | C |
| 6 | $(CH_3)_3C$ | H | H | $CH_2$ | $N(CH_3)_2$ | B | 114–117 | E |
| 7 | $(CH_3)_3C$ | $CH_3$ | $CH_3$ | $CH_3-CH-CH_2$ | $N(CH_3)_2$ | A | 200 | C |
| 8 | $(CH_3)_3C$ | H | H | $(CH_2)_3$ | $N(C_2H_5)_2$ | A | 114–116 | C–D |
| 9 | $(CH_3)_3C$ | H | H | $(CH_2)_3$ | $N(CH_3)_2$ | A | 138–140 | C |
| 10 | $(CH_3)_3C$ | H | H | $(CH_2)_3$ | 4-$CH_3$—piperazino. | 2B | 146–148 | E |
| 11 | $(CH_3)_3C$ | H | H | $(CH_2)_3$ | Morpholino. | A | 130–132 | C–D |
| 12 | $C_6H_5$ | H | H | $(CH_2)_3$ | $N(CH_3)_2$ | A | 111–113 | C–D |
| 13 | $2,6-Cl_2C_6H_3$ | H | H | $CH_2$ | $N(CH_3)_2$ | | 115–117 | D |

Note.—A=cyclohexysulfamate; B=maleate; C=acetone; D=diethyl ether; E=ethanol.

Compounds 1, 2, 6, 7, 9, 10, 11, 12 and 13 are advantageously prepared according to process (a), illustrated by Examples 1 3, 4, 5 and 6 herein, whereas compounds 3, 4, 5 and 8 are preferably obtained according to process (c) illustrated by Example 2.

Example 8

Preparation of 10,000 tablets each containing 10 mg. of the active ingredient:

| Formula: | G. |
|---|---|
| 1-tert.butyl - 4 - (3-dimethylaminopropyl)- 3a,4,5,9b - tetrahydrisoxazolo[5,4-c]isoquinoline cyclohexylsulfamate | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water, q.s. | |

*Procedure:* All the powders are passed through a screen with openings of 0.6 mm. Then the drug substance, lactose, talcum, magnesium stearate and half of the starch are mixed in a suitable mixer. The other half of the starch is suspended in 40 ml. of water and the suspension added to the boiling solution of the polyethyleneglycol in 150 ml. of water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

I claim:
1. A compound corresponding to the formula

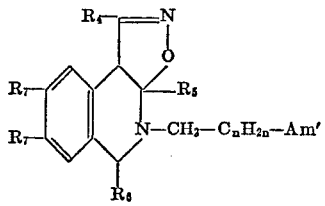

in which $R_4$ is alkyl with up to 4 carbon atoms, phenyl, tolyl, hydroxyphenyl, mono- or di-(methoxy, fluoro, chloro or bromo)-phenyl, each of $R_5$ and $R_6$ is hydrogen or methyl, $R_7$ is hydrogen or methoxy, Am' is mono- or di-alkylamino in which alkyl has up to 4 carbon atoms, pyrrolidino or piperidino and $n$ is the integer 1, 2 or 3, or a therapeutically useful carboxylic or sulfamic acid addition salt thereof.

2. A compound as claimed in claim 1, in which formula $R_4$ is i-propyl, tert.butyl, phenyl or 2,6-dichlorophenyl, each of $R_5$ and $R_6$ is hydrogen or methyl, $R_7$ is hydrogen or methoxy, Am' is mono- or di-(methyl, ethyl or n-propyl)-amino or piperidino, and $n$ is the integer 1 or 2, or the cyclohexylsulfamate or maleate thereof.

3. A compound as claimed in claim 1 and being the 1-tert.butyl - 4 - (3 - dimethylaminopropyl) - 3a,4,5,9b-tetrahydroisoxazolo[5,4-c]isoquinoline, or the cyclohexylsulfamate or maleate thereof.

4. A compound as claimed in claim 1 and being the 1-tert.butyl - 3 - methyl - 4 - (3 - dimethylaminopropyl)-3a,4,5,9b - tetrahydroisoxazolo[5,4-c]isoquinoline, or the cyclohexylsulfamate or maleate thereof.

References Cited
UNITED STATES PATENTS

| | | | |
|---|---|---|---|
| 3,541,101 | 11/1970 | Markillie | 260—288 R |
| 3,565,900 | 2/1971 | Houlihan | 260—286 R |
| 3,630,745 | 12/1971 | Beavers et al. | 260—286 R |

DONALD G. DAUS, Primary Examiner

U.S. Cl. X.R.

260—239 B, 243 C, 247.5 B, 268 TR, 283 S, 286 R, 286 Q; 424—248, 250, 258